W. L. INGRAM.
SIGNAL FOR MOTOR VEHICLES.
APPLICATION FILED JULY 5, 1917.
1,321,374.
Patented Nov. 11, 1919.
3 SHEETS—SHEET 1.
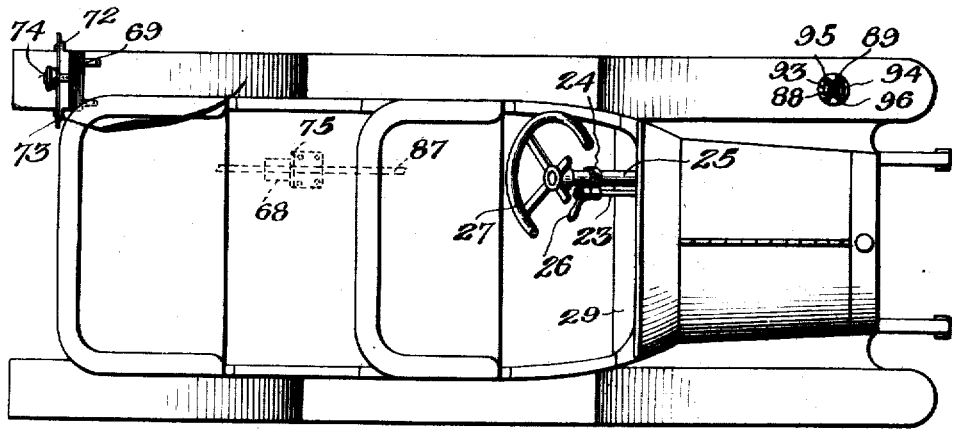
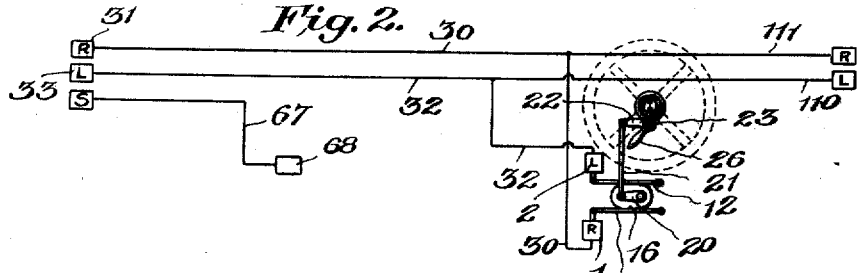
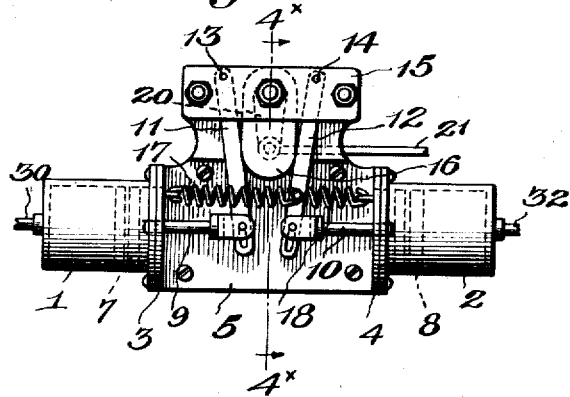
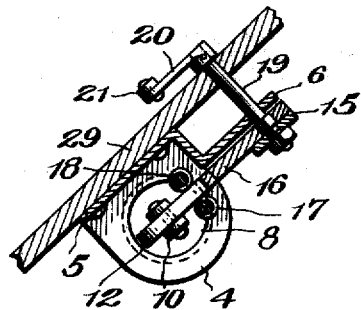
Inventor
Walter L. Ingram,
By Nolt & Symms
his Attorneys

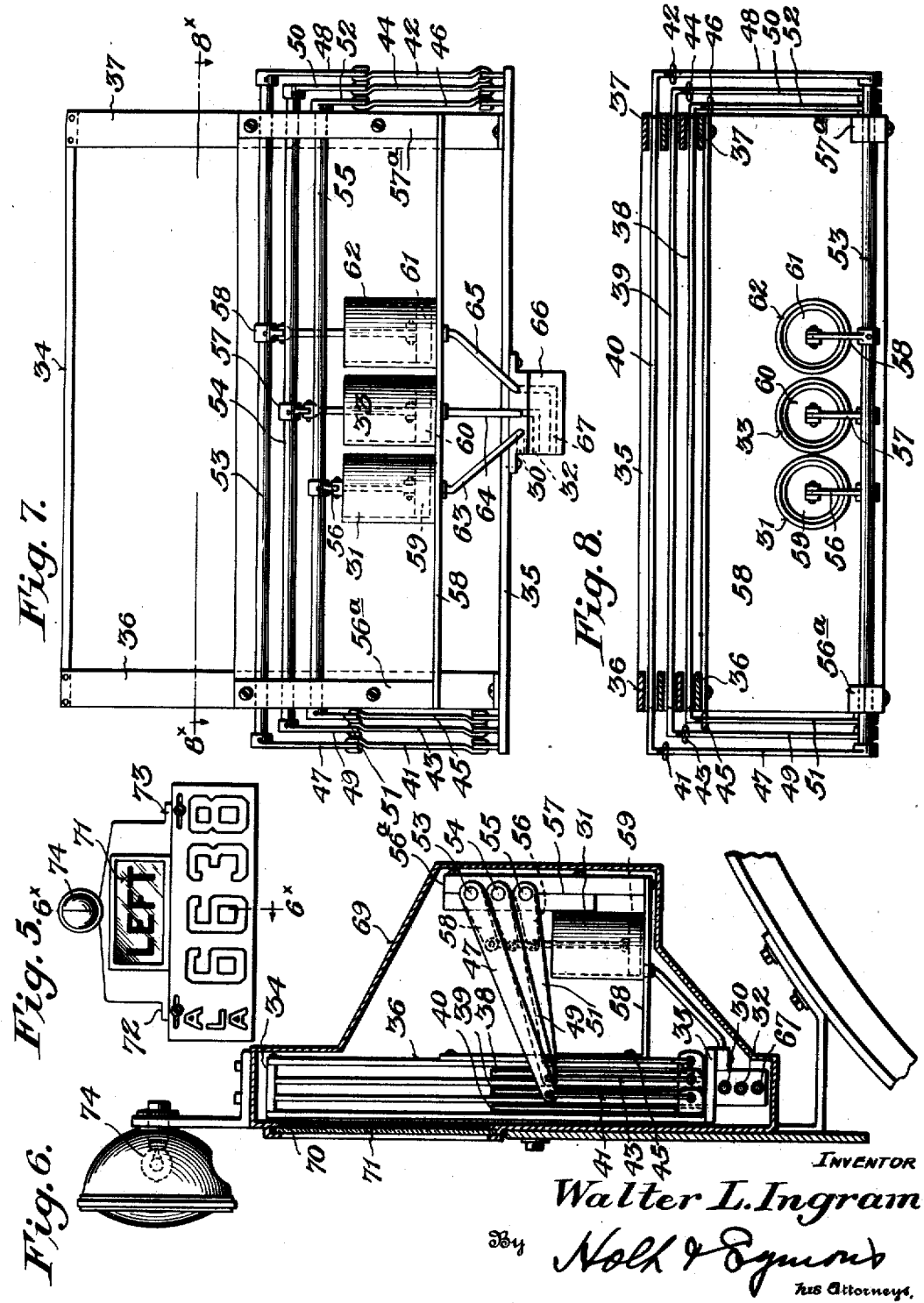

W. L. INGRAM.
SIGNAL FOR MOTOR VEHICLES.
APPLICATION FILED JULY 5, 1917.
1,321,374.
Patented Nov. 11, 1919.
3 SHEETS—SHEET 3.
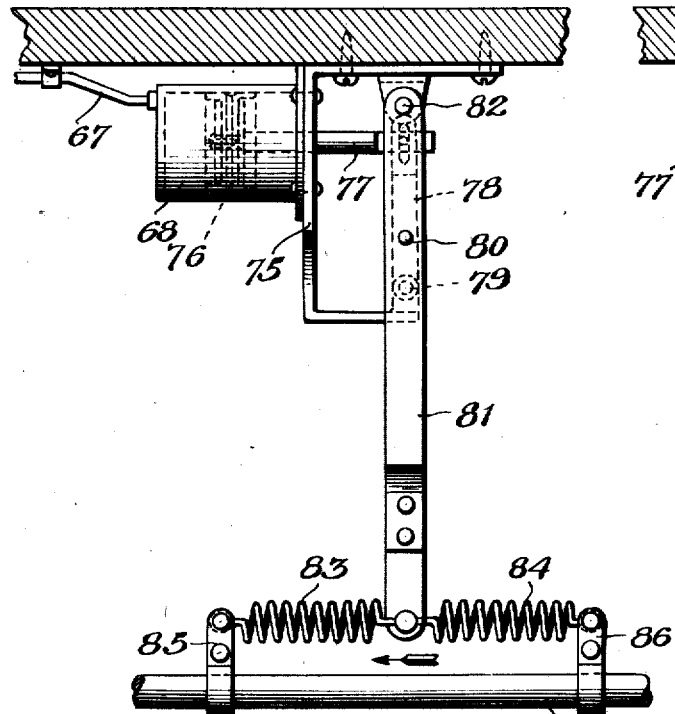
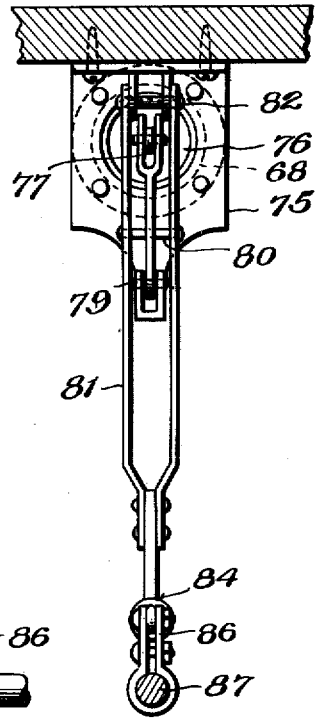
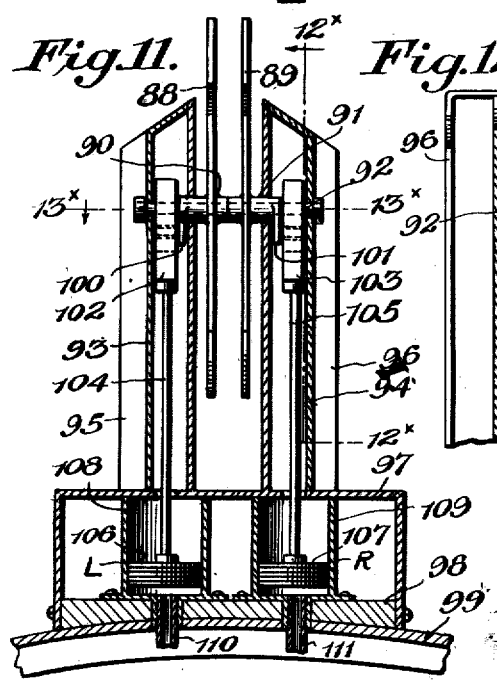
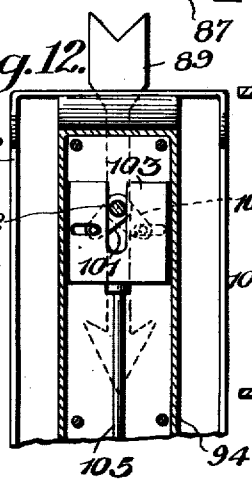
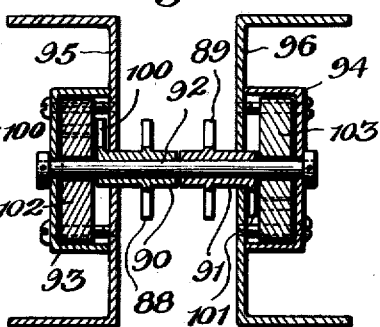
Inventor
Walter L. Ingram,
By Nolh & Symond
his Attorneys

UNITED STATES PATENT OFFICE.

WALTER L. INGRAM, OF SNOWDOUN, ALABAMA, ASSIGNOR OF ONE-HALF TO MOSES MOORE, OF MONTGOMERY, ALABAMA.

SIGNAL FOR MOTOR-VEHICLES.

1,321,374.         Specification of Letters Patent.    Patented Nov. 11, 1919.

Application filed July 5, 1917. Serial No. 178,826.

*To all whom it may concern:*

Be it known that I, WALTER L. INGRAM, a citizen of the United States, residing at Snowdoun, in the county of Montgomery and State of Alabama, have invented certain new and useful Improvements in Signals for Motor-Vehicles, of which the following is a specification.

This invention relates to that class of motor vehicle signals designed to notify the drivers of other vehicles the intention of the party driving the signal equipped vehicle to turn in a given direction, as to the right or to the left, to slacken speed or to stop.

More especially, the invention relates to fluid pressure operated signals of the above class, and its primary object is to provide a system which shall be positive and reliable, add as little extra equipment to the car commensurate with the foregoing characteristics as possible, and which shall, at the same time, be of small cost.

I am aware that such signals have been heretofore operated pneumatically, but these have not only been mechanically different from mine, but have operated upon a different principle, necessitating the carrying of a supply of air under pressure in a storage tank which has to be charged from time to time. Such systems are not only troublesome and faulty in requiring the recharging of the tank and the provision of an additional tank on the car, but are unreliable on account of involving the human element to too great a degree. For example, through inadvertence, the pressure in the storage tank may become exhausted at the very time when the operation of the signal might prevent an accident. My system is designed to eliminate the above pointed out weaknesses of fluid controlled systems, and in order to more fully describe my said invention, reference will now be had to the accompanying drawings, wherein:—

Figure 1 represents in top plan a motor car equipped with one specific embodiment of my invention;

Fig. 2 is a diagram to more particularly show the pipe connections of my improved system;

Fig. 3 is a detail front elevation of the "right" and "left" control cylinders with their more immediately associated parts:

Fig. 4 is a section on the line 4ˣ—4ˣ of Fig. 3;

Fig. 5 is a front elevation of the display signal device adapted to be mounted on the rear of the vehicle;

Fig. 6 is an enlarged detail section on the line 6ˣ—6ˣ of Fig. 5;

Fig. 7 is a rear elevation of the display device shown in Fig. 6 with the casing removed;

Fig. 8 is a section on the line 8ˣ—8ˣ of Fig. 7 looking down;

Figs. 9 and 10 are detail side and end elevations, respectively, of the stop cylinder and brake rod actuating mechanism therefor;

Fig. 11 is a vertical central section of the forward "right" and "left" signals of the semaphore type and mechanism for operating the same;

Fig. 12 is a fragmentary section on the line 12ˣ—12ˣ of Fig. 11; and

Fig. 13 is an enlarged detail section on the line 13ˣ—13ˣ of Fig. 11.

Referring first to the mechanism for controlling the "right" and "left" signals, this comprises, among other parts (see Figs. 1 to 4, inclusive), two cylinders 1 and 2 mounted in axial alinement but with their heads pointing in opposite directions, said cylinders being supported, respectively, upon wings or flanges 3 and 4 formed on a plate 5 having an offset extension 6. The cylinders 1 and 2 carry, respectively, reciprocating pistons 7 and 8 provided with piston rods 9 and 10 attached, respectively, to the lower ends of two depending arms 11 and 12 mounted on pivots 13 and 14 carried by an offset 7 and a plate 15 secured thereto.

Located between these arms is a cam or actuating member 16 against opposite faces of which the said arms are drawn under tension by oppositely acting springs 17 and 18. Cam 16 is fast on a shaft 19 extending through offset 6 and plate 15 and provided with a crank arm 20 fast thereto which is pivotally connected to a rod or link 21 connecting said crank arm with a crank arm 22 fast to a rod 23 rotatable in hollow supports 24 carried by the steering post 25 and provided with a hand operating lever 26 located just beneath the steering wheel 27 and accessible to the driver for imparting angular motion to the rod 23 and therethrough the necessary motion to cam 16 to effect the operation of the pistons 7 and 8, as herein described.

The bracket constituting the plate 5 and parts attached thereto above described may be located in any desired position, but is preferably bolted or otherwise made fast to the under side of the foot-board 29 of the car, shaft 19 passing through said foot-board, and the crank arm 20 and connections therefrom to the steering post rod 23 being located on the opposite side of said foot-board.

The forward end of cylinder 1, which we will assume is the "right" signal cylinder, is in permanent fluid pressure communication, through a small pipe 30, with the forward end of a cylinder 31, and the forward end of cylinder 2, which we will designate the "left" signal cylinder, is in permanent fluid pressure communication, through a similar pipe 32, with the forward end of a cylinder 33. The function of cylinders 31 and 33 is to operate the "right" and "left" display signals which form a part of the display signal device designed to be located at the rear of the vehicle and which will now be described, reference being had particularly to Figs. 5 to 8, inclusive.

This mechanism comprises, among other parts, a frame consisting of upper and lower cross pieces 34 and 35 between which extend two sets of vertical strips 36 and 37 constituting guides between which are located for vertical movement three signal plates 38, 39 and 40 bearing, respectively, on one face of each, the words "Right," "Left" and "Stop." Flexibly attached to the opposite horizontal ends of these plates are, respectively, pairs of links 41—42, 43—44, and 45—46, which are flexibly connected at their upper ends, respectively, to pairs of arms 47—48, 49—50 and 51—52, fast to opposite ends of three rigid shafts 53, 54 and 55 rotatable in upright supports 56 and 57 fast to a horizontal plate 58 rigidly attached to the rearmost upright strips 36—37.

Fast to shafts 53, 54 and 55 are three arms 56, 57 and 58 which are pivotally connected respectively to the piston rods of three pistons 59, 60 and 61 located for reciprocating motion in three cylinders 31, 33 and 62. The piston of cylinder 31 operates the "right" signal; the piston of cylinder 33 the "left" signal, and the piston of cylinder 62 the "stop" signal. These cylinders are all open at their upper ends and closed at their lower ends except for a small air passage into which extend, respectively, three air pipes or tubes 63, 64 and 65 leading to a junction box 66 through which the tubes connect to the tubes 30 and 32 hereinbefore mentioned and to a tube 67 leading to the "stop" cylinder 68 hereinafter more particularly described.

The display slides 38, 39 and 40 and associated parts are inclosed in a suitable casing 69 having an opening 70 provided with a glass covering 71. The forward face of the casing 69 is provided with wings 72 and 73 which are adapted to be attached to any suitable bracket or supporting member on the rear of the car. In the case shown, it is attached to the bracket which carries the license number, which latter may be secured to the front face of a signal casing 69 and just below the display opening or window thereof. If desired, the tail light 74 of the car may be attached to the top of casing 69 so as to direct light down upon the displayed signal as well as upon the license number.

The initial power for operating the piston of the "stop" cylinder 62 is, in the case here shown, derived from the brake rod and is such that each time the brakes are operated to stop or slacken the speed of the car, fluid pressure will be exerted against the piston of cylinder 62 and operate to display the "stop" signal. This mechanism comprises, among other parts, the cylinder 68 hereinbefore referred to and rigidly supported by a suitable bracket 75 fast to the bottom of the car at a desired point, said cylinder having mounted therein for reciprocating motion a piston 76 provided with a piston rod 77 connected to the upper end of a lever 78 pivoted as at 79 to bracket 75 and connected through a pin 80 to a depending lever arm 81 fulcrumed at its upper end, as at 82, and attached at its lower end to two springs 83 and 84 which are in turn connected at opposite ends to two strips 85 and 86 fast to the brake rod 87. The end of cylinder 68 to which the piston rod passes is open at the atmosphere.

Referring now particularly to the "right" and "left" signals, the operation of these is as follows: If the driver desires to display the "right" signal, he turns lever 26 to the right, thereby causing cam 16 acting through arm 11 to force piston 7 forward in cylinder 1 and through the air confined in said cylinder exert a pressure in cylinder 31, acting upward against piston 59 thereof, which operating through a rocker shaft 55, raises the slide 38 to a position in front of the window opening 70, thus displaying the "right" signal. When it is desired to withdraw this signal from display, the operator turns the lever 26 back to neutral position, thus restoring cam 16 to its normal position, whereupon spring 18, acting upon the piston rod 9, will draw the piston of cylinder 1 to the position shown in Fig. 3, thereby creating a suction on the piston of cylinder 62 and allow the latter piston to descend, whereupon the slide bearing the word "Right" will also descend to its position of rest shown in Fig. 6.

It should be stated here that the ends of cylinders 7 and 8 through which the piston rods pass are open to the atmosphere, and it might also be stated that all of the pistons herein mentioned fit their respective cylinders airtight, being provided with suitable packing or piston rings for this purpose.

When it is desired to operate the "left" signal, the driver turns the lever 26 to the left, whereupon the same operation as above described will take place as to the cam 16, arm 12, piston of the "left" operating cylinder 2, piston 60 of the cylinder 33, and display slide 39 carrying the word "Left."

The operation of the "stop" signal is as follows: When power is applied to the brakes, brake rod 87 moves in the direction of the arrow adjacent that part in Fig. 9, whereupon spring 83 acts to swing arm 81 to the left. Arm 81 moving in this direction acts, through pin 80, to swing arm 78 to the left on its pivot 79, thus forcing piston 76 toward the end of cylinder 68. This forces air through tube 67 into the lower end of cylinder 62, creating a pressure against piston 61 and causing the latter to rise, whereupon shaft 63 is rocked so as to lift slide 40 carrying the word "Stop" into a display position in front of the window 70. When the brakes are released, rod 87 moves in the opposite direction to that above described and acts, through spring 84, arm 81 and arm 78 to cause the piston of cylinder 68 to travel in a direction opposite to that above described and to thereby create a suction on the piston of cylinder 62 which draws the latter piston down and causes the rock shaft 53 to rotate in such direction as to lower the slide carrying the word "Stop."

In addition to the rear end signals above described, my invention contemplates the employment of a signal of the semaphore type on a forward portion of the car, as, for example, on one of the forward mud guards, to indicate to a vehicle approaching the one equipped with the signals the direction in which the latter car is about to turn.

This forward signal mechanism comprises, among other parts, two arrows 88 and 89 fast, respectively, to two collars 90 and 91 independently rotatable on a shaft 92 supported in two casings 93 and 94 fast to two uprights 95 and 96 rigidly attached at their lower ends to a cylinder casing 97 having a base 98 adapted to be attached to the mud guard 99 of the car. Collars 90 and 91 are provided, respectively, with crank arms 100 and 101 which are connected by means of pin and slot connections, respectively, to two slide boxes 102 and 103 vertically movable within casings 93 and 94 and attached at their lower edges, respectively, to piston rods 104 and 105 of two pistons 106 and 107 adapted to reciprocate, respectively, in two cylinders 108 and 109 fast to the base 98 and open at their upper ends to the atmosphere. The lower end of piston 108 communicates with a tube 32 leading from cylinder 2, and the lower end of cylinder 109 is in communication through a tube 111 with tube 30 leading from cylinder 1 (see Fig. 2).

Therefore, when hand operated lever 26 is manipulated to operate the "right" signal, pressure will be transmitted from cylinder 1, through tube 111, as well as through tube 30, thus forcing piston 107 upward and thereby causing slide 103, acting through crank arm 101 to rotate arrow 89 in such direction as to point to the right. Likewise, when the hand operated lever 26 is manipulated to operate the "left" signal, pressure will be communicated from cylinder 2 through tube 110, thus causing piston 116 to rise and in a similar way rotate arrow 88 so as to cause the latter to point to the left. These arrows are restored to normal by the downward suction created on pistons 106 and 107 when the pistons of cylinders 1 and 2 return to normal.

While I have herein shown and described but one embodiment of my invention, it should be understood that the same may be modified in various respects without departing from the spirit thereof.

Also, while I have herein described my invention as operating with air pressure, it should be understood that any other gas or a liquid may be used, and in the claims the generic term "fluid" is employed to cover these.

Having thus particularly described my invention, what I claim as new and desire to secure by Letters-Patent is:—

1. Signaling apparatus for motor vehicles comprising a display device having a plurality of movable members each bearing a notifying signal and movable into and out of position to display and conceal said signals, a cylinder individual to each of said signaling members, a reciprocating piston in each of said cylinders, operative connections between said pistons and the respective signaling members, a second set of cylinders one individual to each of said first-mentioned cylinders, a separate pipe connection between each of the first-mentioned cylinders and the corresponding one of the second-mentioned cylinders and forming a permanent fluid connection therebetween, a piston in each of the second-mentioned cylinders, and means to operate the last-mentioned pistons individually to effect pressure on individual ones of the first-mentioned pistons to operate said members.

2. Signaling apparatus for motor vehicles comprising a display device having a plurality of vertically movable slides each bearing a notifying sign or signal and movable into and out of position to display and conceal said signals, a cylinder individual to each of said slides, a reciprocating piston in each of said cylinders, operative connections between said pistons and the respective signaling members, a second set of cylinders one individual to each of said first-mentioned cylinders, a separate pipe connection between each of the first-mentioned cylinders and the corresponding one of the second-mentioned cylinders and forming a permanent fluid connection therebetween, a piston in each of the second-mentioned cylinders, and means to operate the last-mentioned pistons individually to effect pressure on individual ones of the first-mentioned pistons to operate said slides.

3. Signaling apparatus for motor vehicles comprising a display device having a plurality of movable members each bearing a notifying signal and movable into and out of position to display and conceal said signals, a cylinder individual to each of said signaling members, a reciprocating piston in each of said cylinders, operative connections between said pistons and the respective signaling members, a second set of cylinders one individual to each of said first-mentioned cylinders, a separate pipe connection between each of the first-mentioned cylinders and the corresponding one of the second-mentioned cylinders and forming a permanent fluid connection therebetween, a piston in each of the second-mentioned cylinders, an operating member common to each of said last-mentioned pistons and operative to move each in one direction, springs arranged to operate said pistons in opposition to said member, and manual means including a lever mounted on the steering post of the vehicle to operate said member.

4. Signaling apparatus for motor vehicles comprising a display device having a plurality of movable members each bearing a notifying sign or signal and movable into and out of position to display and conceal said signals, a cylinder individual to each of said signaling members, a reciprocating piston in each of said cylinders, operative connections between said pistons and the respective signaling members, and fluid compression means to effect pressure on individual ones of said pistons to operate said members.

In testimony whereof I affix my signature.

WALTER L. INGRAM.